(No Model.)
F. J. HARRISON.
FILM MEASURING AND CUTTING DEVICE.
No. 492,354. Patented Feb. 21, 1893.
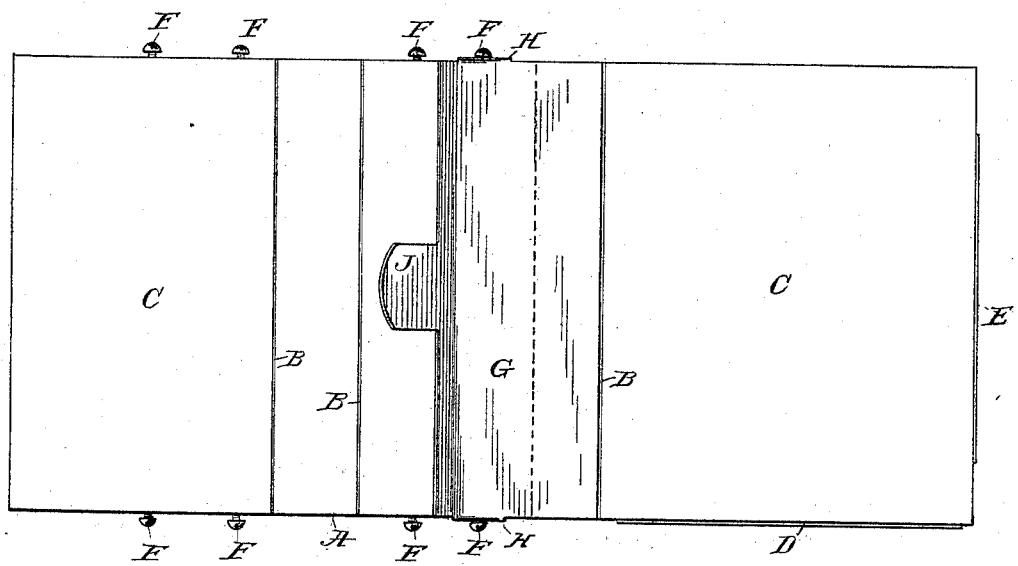
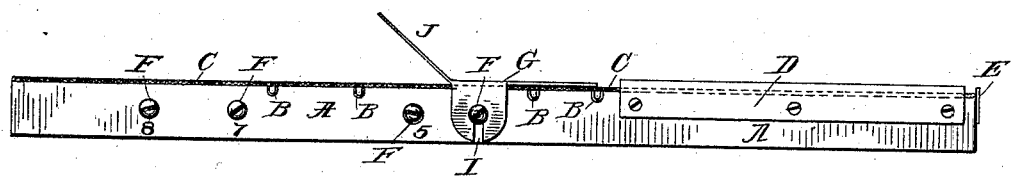
WITNESSES:
INVENTOR
ATTORNEY

UNITED STATES PATENT OFFICE.

FREDERICK J. HARRISON, OF BROOKLYN, ASSIGNOR TO THE E. & H. T. ANTHONY & COMPANY, OF NEW YORK, N. Y.

FILM MEASURING AND CUTTING DEVICE.

SPECIFICATION forming part of Letters Patent No. 492,354, dated February 21, 1893.

Application filed October 8, 1892. Serial No. 448,273. (No model.)

*To all whom it may concern:*

Be it known that I, FREDERICK J. HARRISON, a subject of the Queen of Great Britain, and a resident of Brooklyn, in the county of Kings and State of New York, have invented a certain new and useful Film Measuring and Cutting Device, of which the following is a specification.

My invention relates to a novel device for measuring and severing photographic film.

Heretofore it has been customary to indicate on the film during the process of taking the pictures, the line of separation between adjoining exposures. The place has been thus indicated ordinarily by means of prick points or punctures, made through or partially through the paper.

It has been found in practice that during the rolling up of the film upon the take-up roller in the film holder, that these punctures or depressions are very apt to be squeezed back again into the plain of the film or else so smoothed down as to be scarcely perceptible; consequently when the film is taken into the dark room for development it is frequently necessary to hold it up to as strong a light as possible and to carefully examine it in order to detect the punctures or like marks. This not only is an annoyance sometimes resulting in severing the paper in the wrong place; but also the picture is apt to be injuriously affected because although the exposure is made in the dark room and in non actinic light, nevertheless a considerable exposure to strong light, even if it is non actinic is injurious. Moreover, when the film is severed by shears as is usually the case, it frequently happens that through carelessness or through lack of skill, the shears do not run directly across the film from puncture to puncture but on the contrary very often it runs somewhat crookedly thus necessitating a loss of a portion of the picture, because the edges of the film before mounting have to be straightened. By my invention I obviate all of these objectionable features and also effect a considerable saving in time.

Figure 1, is a plan view of the invention. Fig. 2, is an edgewise elevation.

A is a piece of material ordinarily a piece of wood. It may be a foot long and from four to six inches wide more or less as desired. Transversely across its upper surface are inlaid into the board A grooved pieces of metal preferably brass B.

C is a piece of felt which covers the upper surface of the board and which is cut across through the grooves B. It is preferably fastened to the base A by glue or other cementing material.

D is a gage attached to one side of the base A near the right hand end, and E is another gage fastened across a portion of the end of the base A. They project above the plane of the felt or cloth C as indicated in Fig. 2.

F, F, F, are screws, pins or like devices which are fastened in the edges of the base A as shown.

G is a piece of metal having two downwardly projecting ears or side pieces H in the lower portions of which are slots I adapted to fit over the shanks of the screws or pins F.

J is an upturned handle or thumb piece for the metallic piece G.

The operation of the device is exceedingly simple. After the exposures have been made, the paper is taken into the dark room as usual and the end of it being unrolled is passed under the metallic plate G from left to right. The metallic piece G which I will call the tearing piece being first adjusted upon the pair of screws or pins F which coincide with the size of picture taken and in order to aid in this I mark upon one side of the base piece A figures indicating the size of the piece of film which will be torn off depending upon the location of the tearing piece. That is to say, if the tearing piece be adjusted over the left hand pair of screws or pins F then the piece severed will be eight inches long as shown by Fig. 8 under the screw or pin as shown. If the tearing piece G be placed over the next pair of pins or screws, then the piece severed will be seven inches and so on. I provide in the example shown in the drawings four sets only, representing the four and one-fourth, five, seven, and eight inch lengths. Those being the lengths ordinarily employed in taking photographs of this class. After the end of the film has been drawn through beneath the tearing piece, care is taken to sever it the first time on the line of the first punctures or prick points. This requires some little care, it is true, to determine the location of these prick points, but after the first tearing has been done then there is no further necessity for examination of the film. In making the tear, the tearing piece G is pressed upon the film with the left hand and the film is taken hold of with the right and torn across in the same manner that checks are torn from check books by the use of the ordinary metallic ruler or equivalent device. After the first severing of the paper as above described, then the operator takes hold of the edge of it and in order to enable him easily to do so, the tearing piece is tilted by depressing the thumb piece J which throws upwardly the forward or cutting edge, at the same time holding the paper in place by crowding or binding of the tearing piece upon it, near the back edge of the tearing piece. The operator then with his right hand takes hold of the edge of the paper and pulls it outwardly until its forward edge rests squarely against the guide E and the side of it which is nearest him rests evenly along the guide D. In this way accuracy is secured in the severance of the paper. It will be exact in length and will also be exactly at right angles.

Those who are not familiar or skilled in tearing paper in the way described, may hesitate to make the separations by tearing, consequently I have provided the grooves B and those who prefer so to do, can sever the film by taking a knife and drawing it along the forward edge of the tearing piece G, which entering the grooves B whichever one is adjacent to the edge of the tearing strip will properly sever the paper. I supply the felt C for the purpose of protecting the film against possible injury.

It will be obvious to those who are familiar with this art that it is not essential to embody all of the features of my invention.

A serviceable implement may be made without the felt and without the guides one or both, and also without the grooves B. I prefer though to have all these features present in the device because thereby it is more complete.

I claim—

1. The combination of a base board an adjustable tearing piece and means upon the board to hold the tearing piece in defined positions, substantially as set forth.

2. The combination of a base board, an adjustable tearing piece and means upon the board to hold the tearing piece in defined positions, and a guide or guides to aid in determining the position of the paper, substantially as set forth.

3. The combination of a base board, an adjustable tearing piece and means upon it to hold the tearing piece in defined positions, and grooves across the base board which coincide in position with that of the edge of the tearing piece, substantially as set forth.

4. The combination of a base board, an adjustable tearing piece and means upon the board to hold the tearing piece in defined positions, and a yielding cloth like layer of material upon the face of the base board, substantially as set forth.

5. The combination of a base board, an adjustable tearing piece, means upon the board to hold the tearing piece in defined positions, a yielding cloth like layer of material upon the face of the base board, and grooves across the surface of the board and guides to aid in determining the location of the film, substantially as set forth.

Signed at New York, in the county of New York and State of New York, this 3d day of October, A. D. 1892.

FREDERICK J. HARRISON.

Witnesses:
PHILLIPS ABBOTT,
LEWIS HEUER, Jr.